United States Patent
Littler et al.

(10) Patent No.: US 10,877,831 B1
(45) Date of Patent: Dec. 29, 2020

(54) SECURE DISTRIBUTED ONBOARD MAINTENANCE CIRCUIT

(71) Applicant: Rockwell Collins, Inc., Cedar Rapids, IA (US)

(72) Inventors: Ryan P. Littler, Cedar Rapids, IA (US); Brian R. Roggendorf, Marion, IA (US); Johnathan C. Lewis, Center Point, IA (US); James A. Marek, Anamosa, IA (US); Edward C. Tubbs, Cedar Rapids, IA (US); John G. Bendickson, Vinton, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 122 days.

(21) Appl. No.: 16/049,177

(22) Filed: Jul. 30, 2018

(51) Int. Cl.
| G06F 11/00 | (2006.01) |
| G06F 11/07 | (2006.01) |
| G06N 3/08 | (2006.01) |
| G06F 21/85 | (2013.01) |

(52) U.S. Cl.
CPC ............ *G06F 11/076* (2013.01); *G06F 21/85* (2013.01); *G06N 3/08* (2013.01)

(58) Field of Classification Search
CPC .......... G06F 11/076; G06F 21/85; G06N 3/08

USPC .......................................................... 714/37
See application file for complete search history.

(56) References Cited

U.S. PATENT DOCUMENTS

| 8,161,281 | B1 | 4/2012 | Johnson et al. |
| 2012/0185911 | A1* | 7/2012 | Polite .................. G06F 21/6218 726/1 |
| 2018/0241717 | A1* | 8/2018 | Bond ...................... H04L 63/02 |
| 2020/0099658 | A1* | 3/2020 | Couillard ................ G06F 21/44 |

* cited by examiner

Primary Examiner — Yair Leibovich
(74) Attorney, Agent, or Firm — Suiter Swantz pc llo

(57) ABSTRACT

A secure onboard maintenance circuit (OMC) includes a primary OMC node with a controller, a secure storage, a trusted CDS interface, and a configurable I/O interface for connecting to at least one system component. The controller is configured to receive maintenance information via the configurable I/O interface and the trusted CDS interface and is further configured to store data associated with the maintenance information in the secure storage. The OMC further includes at least one secondary OMC node with a second controller, a second trusted CDS interface, and a second configurable I/O interface for connecting to at least one other system component. The second controller is configured to receive maintenance information via the second configurable I/O interface and is further configured to transmit the maintenance information to the primary OMC node via the second trusted CDS interface.

22 Claims, 6 Drawing Sheets

SECURE DISTRIBUTED ONBOARD MAINTENANCE CIRCUIT

BACKGROUND

Vehicles (e.g., aircraft, boats, cars, busses, trains, etc.) include a plurality of sensors, actuators, switches, and other system components that can have different levels of security associated therewith. For example, aircraft systems can include several security levels, such as classified and unclassified domains, for operating and/or accessing information associated with the aircraft system components. Consequently, maintenance operators may be unable to view real-time information associated with a system component in a classified domain without having direct access to the classified domain. There is a need in the art for systems that enable maintenance operators to access real-time information for system components distributed among classified and unclassified domains without requiring that the maintenance operators be granted such access.

SUMMARY

In an aspect, embodiments of the inventive concepts disclosed herein are directed to a secure onboard maintenance circuit (OMC) for a plurality of system components distributed among unclassified and classified security domains. In embodiments, the secure OMC includes a primary OMC node in an unclassified security domain and at least one secondary OMC node in a classified security domain. The primary OMC node includes a controller, a secure storage, a trusted CDS interface, and a configurable I/O interface for connecting to at least one system component and/or for connecting to an operator interface device. The secondary OMC node includes a second controller, a second trusted CDS interface, and a second configurable I/O interface for connecting to at least one other system component. The second controller is configured to receive maintenance information via the second configurable I/O interface and is further configured to transmit the maintenance information to the primary OMC node via the second trusted CDS interface. The controller of the primary OMC node is configured to receive the maintenance information from the secondary OMC node via the trusted CDS interface and is further configured to store data associated with the maintenance information in the secure storage.

In another aspect, embodiments of the inventive concepts disclosed herein are directed to an aircraft system that includes a secure OMC. In embodiments, the aircraft system includes an operator interface device, a plurality of aircraft system components distributed among unclassified and classified security domains, and a secure OMC with a primary OMC node in an unclassified security domain and at least one secondary OMC node in a classified security domain. The primary OMC node includes a controller, a secure storage, a trusted CDS interface, and a configurable I/O interface for connecting to at least one aircraft system component and/or for connecting to the operator interface device. The secondary OMC node includes a second controller, a second trusted CDS interface, and a second configurable I/O interface for connecting to at least one other aircraft system component. The second controller is configured to receive maintenance information via the second configurable I/O interface and is further configured to transmit the maintenance information to the primary OMC node via the second trusted CDS interface. The controller of the primary OMC node is configured to receive the maintenance information from the secondary OMC node via the trusted CDS interface and is further configured to store data associated with the maintenance information in the secure storage.

In another aspect, embodiments of the inventive concepts disclosed herein are directed to a method of implementing a secure OMC for a plurality of system components distributed among unclassified and classified security domains. The method includes: connecting a primary OMC node to an operator interface and/or a system component in an unclassified security domain; connecting at least one secondary OMC node to at least one other system component in a classified security domain; receiving maintenance information from the other system component via a configurable I/O interface of the secondary OMC node; transmitting the maintenance information to the primary OMC node via a trusted CDS interface of the secondary OMC node; receiving the maintenance information at the primary OMC node via a trusted CDS interface of the primary OMC node; and storing data associated with the maintenance information in a secure storage of the primary OMC node.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
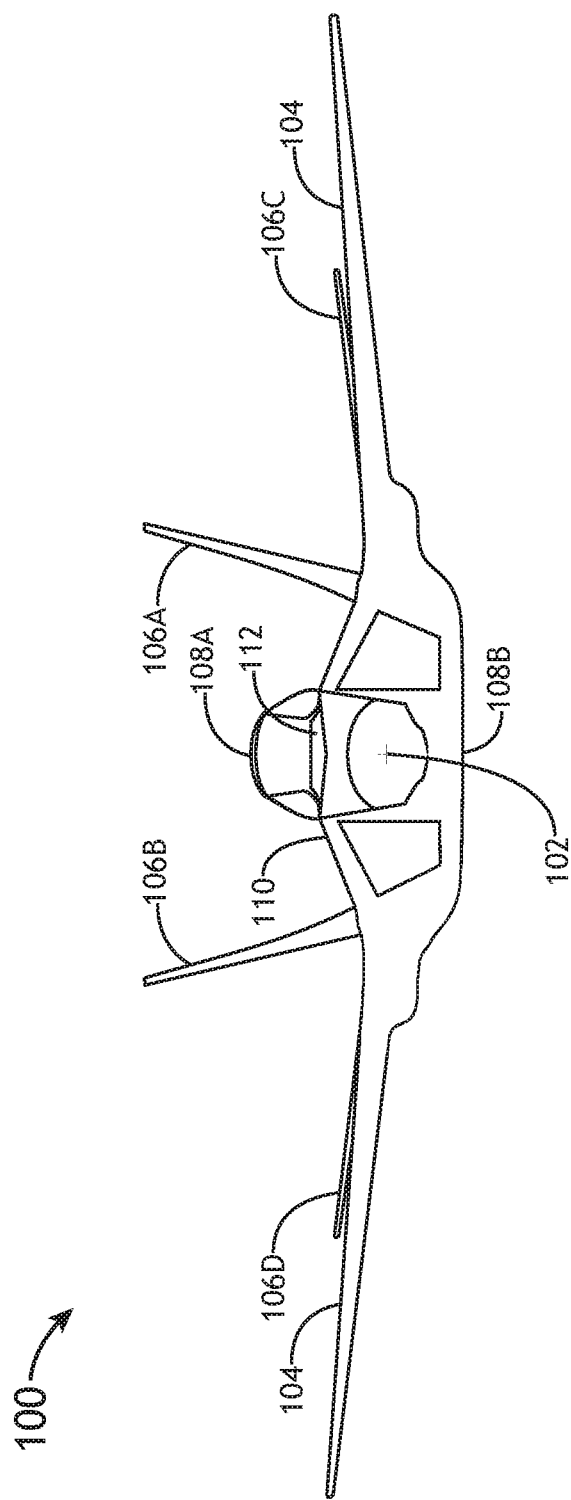
FIG. 1 is an illustration of an example environment in which a secure onboard maintenance circuit (OMC) may be implemented, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

Broadly, embodiments of the inventive concepts disclosed herein are directed to systems and methods that implement a secure onboard maintenance circuit (OMC) for a plurality of system components distributed among unclassified and classified security domains. A scalable secure distributed OMC approach for hosting fault detection and/or fault isolation algorithms in multilevel security systems (MLS) is disclosed. In embodiments, the secure OMC provides a trusted CDS (cross-domain solution) interface for the labeling of MLS system data for use in real-time fault detection and/or isolation. The secure OMC can also provide a secure data-at-rest solution and remote power for uncleared maintainers to access built-in test (BIT) results while the system is powered down. Remote power function is the ability for a maintainer (sometimes referred to herein as a "maintenance operator") to independently power only the OMC circuit in a larger MLS subsystem, for example, when a maintainer accesses video datalink BIT results, or the like.

FIG. 1 illustrates an example of an aircraft 100 environment in which a secure OMC as described herein can be implemented. The aircraft 100 can include a number of system components (e.g., sensors, actuators, switches, transmitters, receivers, transceivers, input/output (I/O) devices, and the like) disposed within the aircraft 100 and/or on the aircraft 100. For example, various system components may be disposed within a cockpit 112, passenger cabin, luggage cabin, or other passenger/cargo compartment of the aircraft 100. System components can also be located at the nose 102, wings 104, stabilizers 106 (e.g., vertical stabilizers 106A, 106B and/or horizontal stabilizers 106C, 106D), body 108 (e.g., upper surface 108A, lower surface 108B, and/or side portion), and/or tail 110 of the aircraft 100. The aircraft 100 illustrated in FIG. 1 is provided as an example, and it is to be understood that a secure OMC as described herein may be implemented within any other type of aircraft 100. It is further noted that while a secure OMC can be implemented within an aircraft system, the secure OMC described herein is not limited to aircraft implementations and can also be implemented in any other type of vehicle (e.g., spacecraft, watercraft, terrestrial vehicle, etc.) or any secured system (e.g., an industrial control system/facility, or the like).

Figure 2:
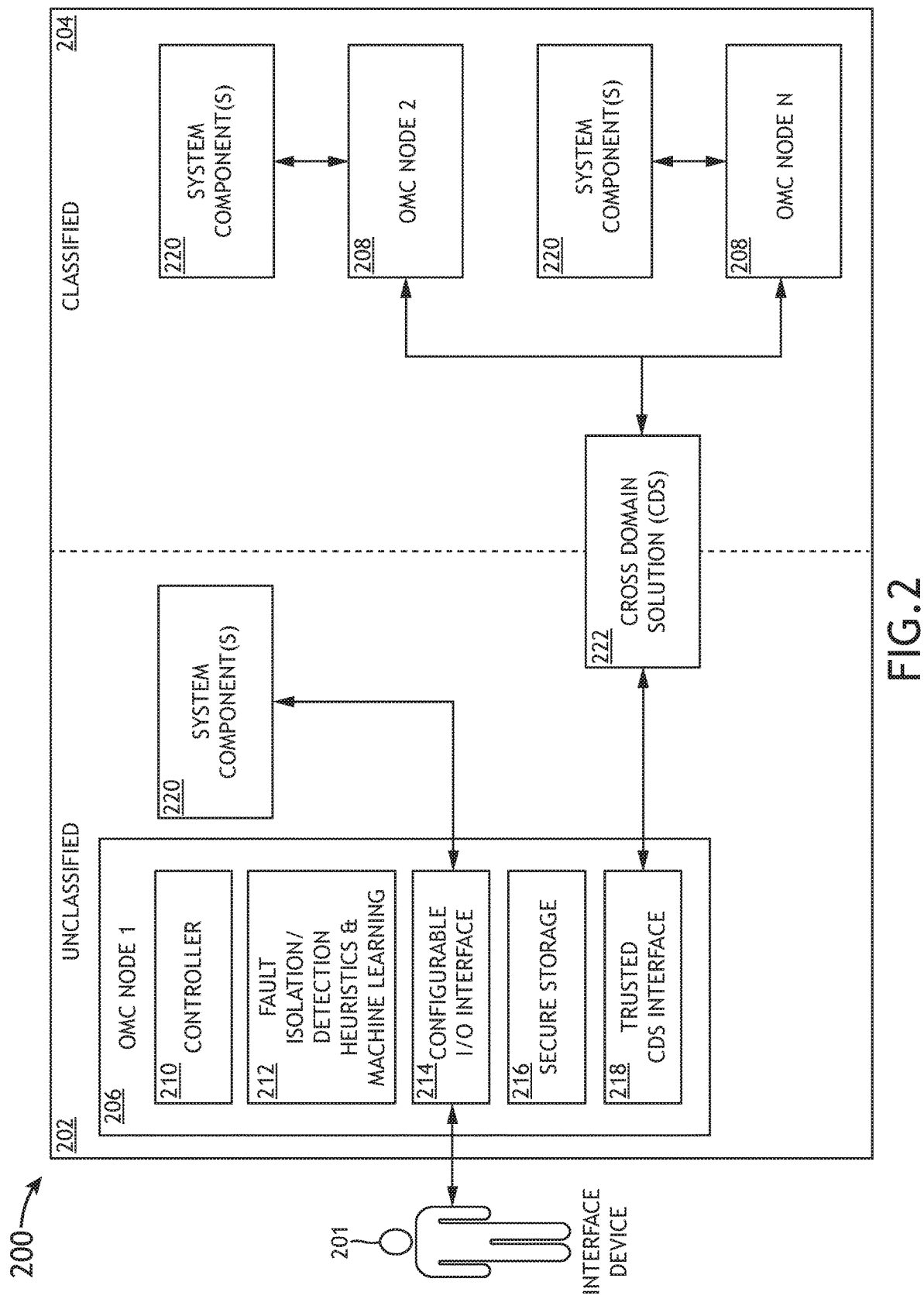
FIG. 2 is a block diagram illustrating a system that includes a secure OMC for a plurality of system components distributed among unclassified and classified security domains, in accordance with example embodiments of this disclosure.
Figure 4:
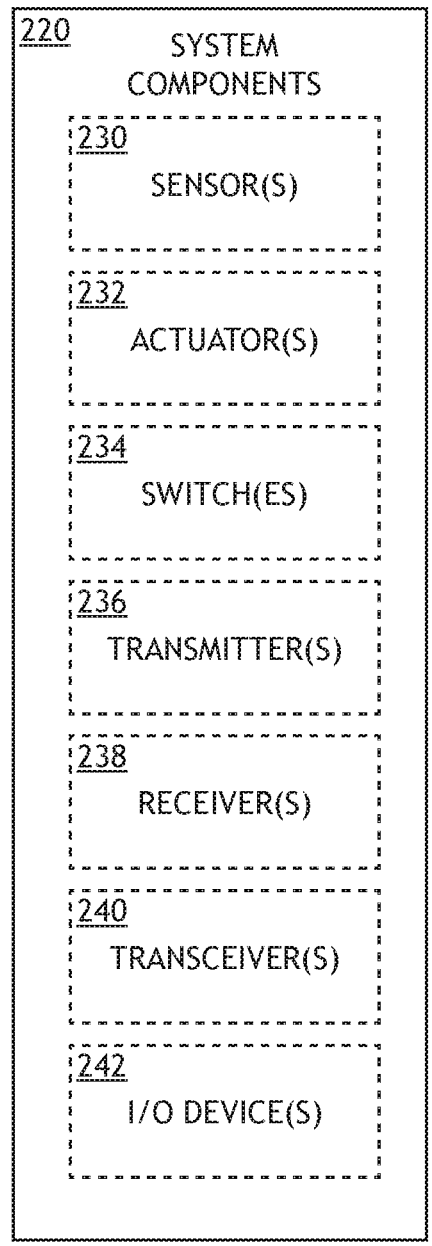
FIG. 4 is a block diagram illustrating one or more system components that can be coupled to an OMC node of a secure OMC, in accordance with example embodiments of this disclosure.

An example embodiment of a system 200 that incorporates a secure OMC is illustrated in FIG. 2. The system 200 can be implemented in an aircraft (e.g., aircraft 100) or any other vehicle or secured system that supports a combination of unclassified and classified security domains. In embodiments, the system 200 is a MLS with a plurality of security domains including at least an unclassified security domain 202 and a classified security domain 204. The system 200 can include a plurality of system components 220 (e.g., aircraft system components, or more generally, one or more sensors 230, actuators 232, switches 234, transmitters 236, receivers 238, transceivers 240, I/O devices 242, or any combination thereof, as shown in FIG. 4, or the like).

A maintenance operator may have access to an operator interface device 201 (e.g., a computer or mobile device (e.g., tablet, smartphone, notebook, etc.)) that is configured to send and receive communications to and from the unclassified security domain 202. The operator interface device 201 may be at least partially restricted from sending or receiving communications to/from the classified security domain 204. For example, the operator interface device 201 may be unable to directly send communications to or receive communications from system components 220 in the classified security domain 204 when the system components 220 are online (e.g., powered on and connected to the system network).

The OMC includes a plurality of OMC nodes distributed throughout the system 200, for example, a primary OMC node 206 and one or more secondary OMC nodes 208. In embodiments, the primary OMC node 206 is in the unclassified domain 202 and is accessible by the operator interface device 201. For example, the operator interface device 201 can be communicatively coupled to the primary OMC node 206 via a configurable I/O interface 214 of the primary OMC node 206. The configurable I/O interface 214 can also facilitate connectivity between the primary OMC node 206 and one or more system components 220 in the unclassified domain 202. The configurable I/O interface 214 can support I/O connectivity for a range of systems and may be tailorable to the implementation environment. Each of the secondary OMC nodes 208 can also include a respective configurable I/O interface 214 for connecting to one or more respective system components 220. For example, in the example embodiment shown in FIG. 2, the primary OMC node 206 is connected to one or more system components 220 in the unclassified domain 202 and the secondary OMC nodes 208 are connected to respective system components 220 in the classified domain 204.

The primary OMC node 206 includes a controller 210 configured to execute operations of the primary OMC node 206. For example, the controller 210 can be programmed with fault isolation and/or fault detection heuristics and machine learning logic 212 for the OMC. Each of the secondary OMC nodes 208 may also include a respective controller 210. The controllers 210 can also manage communications between each of the OMC nodes 206, 208 and communicatively coupled system components 220, interface devices (e.g., operator interface device 201), and other OMC nodes (e.g., communications between the primary OMC node 206 and the secondary OMC nodes 208, and so forth).

Figure 3:
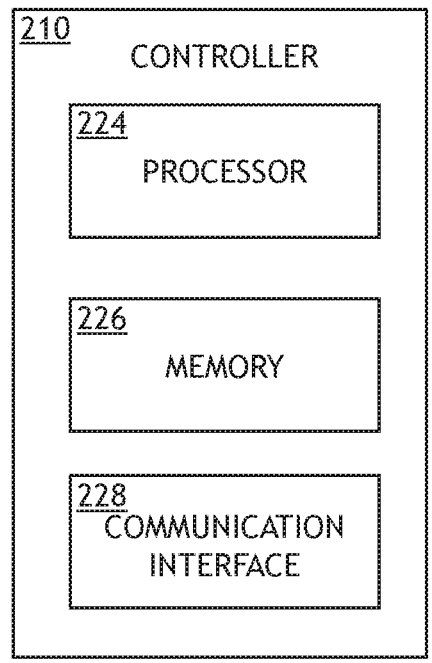
FIG. 3 is a block diagram illustrating a controller for an OMC node of a secure OMC, in accordance with example embodiments of this disclosure.

As shown in FIG. 3, in embodiments, the controller 210 includes a processor 224, memory 226, and a communication interface 228. The processor 224 provides processing functionality for at least the controller 210 and can include any number of processors, micro-controllers, circuitry, field programmable gate array (FPGA) or other processing systems, and resident or external memory for storing data, executable code, and other information accessed or generated by the controller 210. The processor 224 can execute one or more software programs embodied in a non-transitory computer readable medium (e.g., memory 226) that implement techniques described herein. The processor 224 is not limited by the materials from which it is formed, or the processing mechanisms employed therein and, as such, can be implemented via semiconductor(s) and/or transistors (e.g., using electronic integrated circuit (IC) components), and so forth.

The memory 226 can be an example of tangible, computer-readable storage medium that provides storage functionality to store various data and/or program code associated with operation of the controller 210/processor 224, such as software programs and/or code segments, or other data to instruct the processor 224, and possibly other components of the controller 210, to perform the functionality described herein. Thus, the memory 226 can store data, such as a program of instructions (e.g., fault isolation and/or fault detection heuristics and machine learning logic 212) for operating the controller 210, including its components (e.g., processor 224, communication interface 228, etc.), and so forth. It should be noted that while a single memory 226 is described, a wide variety of types and combinations of memory (e.g., tangible, non-transitory memory) can be employed. The memory 226 can be integral with the processor 224, can comprise stand-alone memory, or can be a combination of both. Some examples of the memory 226 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 228 can be operatively configured to communicate with components of the controller 210. For example, the communication interface 228 can be configured to retrieve data from the processor 224 or other devices (e.g., configurable I/O interface 214, secure storage 216, trusted CDS interface 218, etc.), transmit data for storage in the memory 226, retrieve data from storage in the memory 226, and so forth. The communication interface 228 can also be communicatively coupled with the processor 224 to facilitate data transfer between components of the controller 210 and the processor 224. It should be noted that while the communication interface 228 is described as a component of the controller 210, one or more components of the communication interface 228 can be implemented as external components communicatively coupled to the controller 210 via a wired and/or wireless connection. The controller 210 can also include and/or connect to one or more input/output (I/O) devices (e.g., via the communication interface 228 and/or configurable I/O interface 214), such as a mouse, a trackball, a trackpad, a joystick, a line select device, a touchpad, a touchscreen, a keyboard, a keypad, a microphone (e.g., for voice commands)), and so forth. In embodiments, the communication interface 228 includes or is coupled to the configurable I/O interface 214, a transmitter, receiver, transceiver, physical connection interface, or any combination thereof.

The primary OMC node 206 and each of the secondary OMC nodes 208 include respective trusted CDS interfaces 218. The trusted CDS interfaces 218 enable the OMC nodes 206, 208 to communicate with one another via a cross domain solution (CDS) 222. For example, the trusted CDS interfaces 218 can include trusted labelers that attach a label, certificate, or security code to cross-domain communications, or embed the label, certificate, or security code within the cross-domain communications, transmitted from the classified domain 204 to the unclassified domain 202, or vice versa, so that the communications can bypass security MLS restrictions on communications between the domains. In other embodiments, the trusted CDS interfaces 218 are configured to encode or encrypt the cross-domain communications and/or transmit the communications in a trusted format for cross-domain communications. In some embodiments, the cross-domain communications are limited to maintenance information (e.g., diagnostic information (e.g., fault messages), performance information (e.g., test data), or the like) associated with one or more of the system components 220.

In embodiments, the system 200 and/or OMC may be configured with temporal integrity awareness. For example, the OMC nodes 206, 208 can be configured to communicate unclassified data associated with system startup information when the system 200 is not yet in a secured state. The OMC nodes 206, 208 can be configured to then transition to controlled cross-domain communications of data when the system 200 reaches a secured state.

The primary OMC node 206 includes a secure storage 216 (e.g., an encrypted memory medium) for storing data associated with the cross-domain communications (e.g., for logging maintenance information for one or more of the system components 220). The secure storage 216 may also be configured to store adaptive software algorithms (e.g., fault isolation and/or fault detection heuristics and machine learning logic 212) for the controller 210.

The controller 210 of the primary OMC node 206 is communicatively coupled with the configurable I/O interface 214, the trusted CDS interface 218, and the secure storage 216. The controller 210 of the primary OMC node 206 is configured to receive maintenance information via the configurable I/O interface 214 (e.g., from one or more system components 220 in the unclassified domain 202) and is further configured to receive maintenance information via the trusted CDS interface 218 (e.g., from one or more system components 220 in the classified domain 204, i.e., information transmitted by one or more of the secondary OMC nodes 208). The controller 210 of the primary OMC node 206 can be configured to store data associated with this maintenance information in the secure storage 216.

In embodiments, a controller 210 of a secondary OMC node 208 is similarly in communication with a respective configurable I/O interface 214 and a respective trusted CDS interface 218. The controller 210 of the secondary OMC node 208 is configured to receive maintenance information (e.g., from one or more respective system components 220 in the classified domain 204) via the configurable I/O interface 214 of the secondary OMC node 208 and is configured to transmit the maintenance information to the primary OMC node 206 via the trusted CDS interface 218 of the secondary OMC node 208. The secondary OMC node 208 may also include a respective secure storage 216, where the controller 210 of the secondary OMC node 208 can be configured to at least temporarily store the maintenance information (e.g., prior to communicating the maintenance information to the primary OMC node 206 via the trusted CDS interface 218 of the secondary OMC node 208).

The controller 210 of the primary OMC node 206 can be configured to detect and/or isolate faults affecting one or more of the system components 220 based upon the maintenance information received via the configurable I/O interface 214 and/or the trusted CDS interface 218. For example, as previously described, the controller 210 may be programmed with fault isolation and/or fault detection heuristics and machine learning logic 212 for the OMC. In some embodiments, the controller is configured with a heuristic model for detecting and/or isolating the faults based upon the maintenance information. For example, the heuristic model can employ feedback and/or feedforward mechanisms to detect, isolate, and/or predict faults based upon maintenance information collected over time. In some embodiments, the controller 210 is configured with a neural network or another type of machine learning logic or artificial intelligence (AI) logic for detecting and/or isolating the faults based upon the maintenance information.

Figure 5:
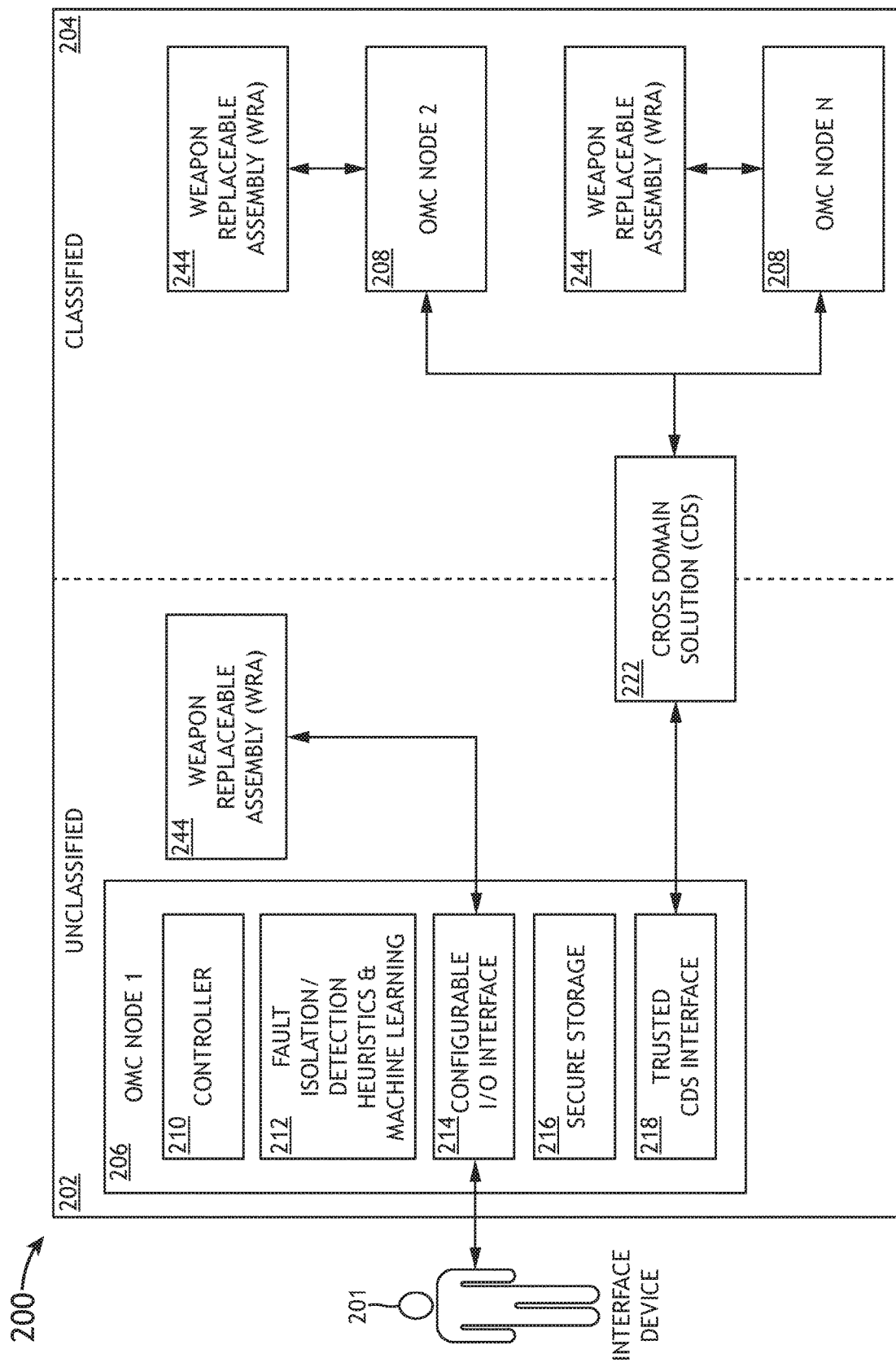
FIG. 5 is a block diagram illustrating a system that includes a secure OMC for weapon replaceable assembly (WRA) components distributed among unclassified and classified security domains, in accordance with example embodiments of this disclosure.

The system 200 can include, but is not limited to, an aircraft system. For example, the system components 220 may include one or more sensors, actuators, switches, transmitters, receivers, transceivers, and/or I/O devices for an aircraft (e.g., aircraft 100, or the like). In an example embodiment shown in FIG. 5, the system components 220 include one or more weapon replaceable assembly (WRA) components 244 for an aircraft. However, as previously noted, the system 200 is not limited to an aircraft implementation and can be implemented in any other vehicle or secured system with a MLS.

The distributed MLS approach for aggregation of fault data and/or other maintenance information from WRA components 244 or other system components 220 serves to bridge low integrity and high integrity systems. For example, the distributed MLS approach described herein can improve security and/or safety within such systems. In some embodiments, multiple OMCs can be implemented within the system 200, each OMC having a respective plurality of distributed nodes. This can serve to improve security, safety, and/or privacy capabilities of the system 200, for example, by having different levels of user permissions for accessing the different OMCs. In some embodiments, the OMCs can be independently powered to provide redundancy for the system 200, for example, in case one of the OMCs experiences a power failure. The OMC nodes may also have independent power supplies/sources and/or zonal power supplies/sources to enhance system defense against power failures affecting one or more of the nodes.

Figure 6:
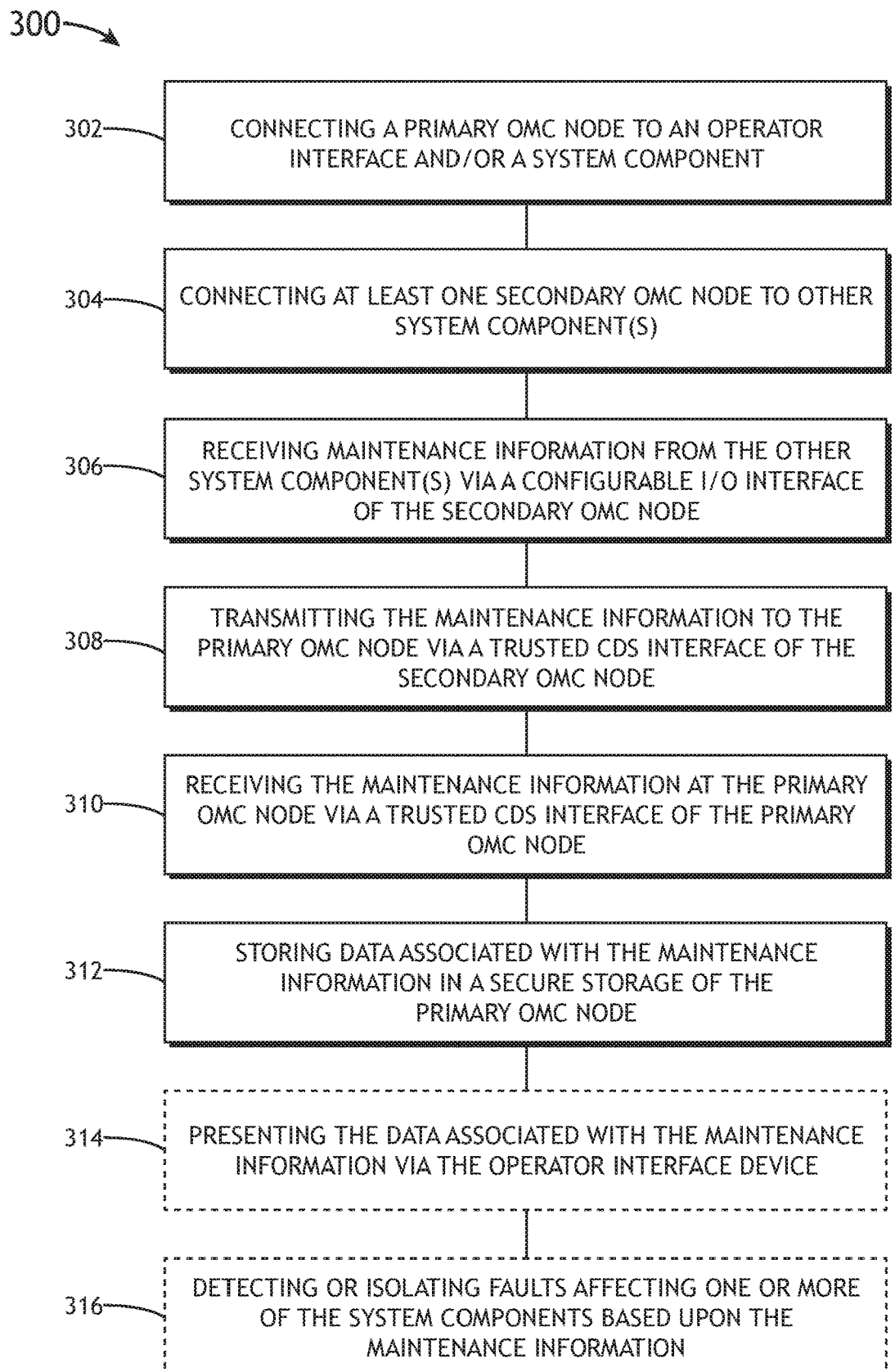
FIG. 6 is a flow diagram illustrating an example implementation of a method of implementing a secure OMC for a plurality of system components distributed among unclassified and classified security domains, such as the secure OMC illustrated in any of FIG. 1 through 5, or a combination thereof.

FIG. 6 illustrates an example implementation of a method 300 that employs a secure OMC, such as the secure OMC of system 200, for a plurality of system components distributed among unclassified and classified security domains. In general, operations of disclosed processes (e.g., method 300) may be performed in an arbitrary order, unless otherwise provided in the claims.

The method 300 includes connecting a primary OMC node to an operator interface and/or a system component (block 302). For example, the primary OMC node 206 is connected to the operator interface device 201 and/or one or more respective system components 220 in the unclassified domain 202. The method 300 further includes connecting at least one secondary OMC node to at least one other system component in a classified security domain (block 304). For example, a secondary OMC node 208 is connected one or more respective system components in the classified domain 204. Maintenance information is then received from the other system component 220 via a configurable I/O interface 214 of the secondary OMC node 208 (block 306). The maintenance information is then transmitted from the secondary OMC node 208 to the primary OMC node 206 via a trusted CDS interface 218 of the secondary OMC node 208 (block 308). The maintenance information is received at the primary OMC node 206 via a trusted CDS interface 218 of the primary OMC node 206 (block 310). Data associated with the maintenance information can be stored in a secure storage 216 of the primary OMC node 206 (block 312). For example, the controller 210 of the primary OMC node 206 can be configured to store the maintenance information and/or fault isolation and/or detection data associated with the maintenance information in the secure storage 216.

In some implementations, the data stored in the secure storage 216 can be presented to a maintenance operator via the operator interface device 201 (block 314). For example, the data may be presented via a display or other output device of the operator interface device 201. This operator interface device 201 may also provide power to the primary OMC node 206 for operation when the system 200 is powered off.

In some implementations, the maintenance information is used to detect and/or isolate faults affecting one or more of the system components 220 (block 316). For example, as previously described herein, the controller 210 of the primary OMC node 206 can be configured to detect and/or isolate faults affecting one or more of the system components 220 based upon the maintenance information received via the configurable I/O interface 214 and/or the trusted CDS interface 218. In some implementations, the maintenance information is fed into a heuristic model and/or a neural network for detecting and/or isolating faults affecting one or more of the system components 220.

The method 300 may further include any step or operation implied or required by the embodiments of system 200 described herein. The system 200 can also include any additional component or functionality expressed or implied by the method 300.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A secure onboard maintenance circuit (OMC) for a plurality of system components distributed among unclassified and classified security domains, the secure OMC comprising:
  a primary OMC node, the primary OMC node including:
    a configurable input/output (I/O) interface for connecting to at least one system component of the plurality of system components;
    a trusted cross-domain solution (CDS) interface;
    a secure storage; and
    a controller in communication with the configurable I/O interface, the trusted CDS interface, and the secure storage, the controller configured to receive maintenance information via the configurable I/O interface and the trusted CDS interface and configured to store data associated with the maintenance information in the secure storage; and
  at least one secondary OMC node, the at least one secondary OMC node including:
    a second configurable I/O interface for connecting to at least one other system component of the plurality of system components;
    a second trusted CDS interface; and
    a second controller in communication with the second configurable I/O interface and the second trusted CDS interface, the second controller configured to receive secondary maintenance information via the second configurable I/O interface and configured to transmit the secondary maintenance information to the primary OMC node via the second trusted CDS interface,
  wherein the plurality of system components includes one or more weapon replaceable assembly (WRA) components.

2. The secure OMC of claim 1, wherein the second trusted CDS interface is configured to communicate the secondary maintenance information to the trusted CDS interface of the primary OMC node via a cross-domain solution.

3. The secure OMC of claim 1, wherein at least one of the maintenance information or the secondary maintenance information comprises at least one of diagnostic information or performance information associated with one or more of the plurality of system components.

4. The secure OMC of claim 1, wherein the controller is configured to detect or isolate faults affecting one or more of the plurality of system components based upon at least one of the maintenance information or the secondary maintenance information.

5. The secure OMC of claim 4, wherein the controller is configured with a heuristic model for detecting or isolating the faults based upon at least one of the maintenance information or the secondary maintenance information.

6. The secure OMC of claim 4, wherein the controller is configured with a neural network for detecting or isolating the faults based upon at least one of the maintenance information or the secondary maintenance information.

7. An aircraft system, comprising:
  an operator interface device;
  a plurality of aircraft system components distributed among unclassified and classified security domains, wherein the plurality of aircraft system components includes one or more weapon replaceable assembly (WRA) components;
  a primary OMC node, the primary OMC node including:
    a configurable input/output (I/O) interface for connecting to at least one system component of the plurality of aircraft system components and for connecting to the operator interface device;
    a trusted cross-domain solution (CDS) interface;
    a secure storage; and
    a controller in communication with the configurable I/O interface, the trusted CDS interface, and the secure storage, the controller configured to receive maintenance information via the configurable I/O interface and the trusted CDS interface and configured to store data associated with the maintenance information in the secure storage; and
  at least one secondary OMC node, the at least one secondary OMC node including:
    a second configurable I/O interface for connecting to at least one other system component of the plurality of aircraft system components;
    a second trusted CDS interface; and
    a second controller in communication with the second configurable I/O interface and the second trusted CDS interface, the second controller configured to receive secondary maintenance information via the second configurable I/O interface and configured to transmit the secondary maintenance information to the primary OMC node via the second trusted CDS interface.

8. The aircraft system of claim 7, wherein the second trusted CDS interface is configured to communicate the secondary maintenance information to the trusted CDS interface of the primary OMC node via a cross-domain solution.

9. The aircraft system of claim 7, wherein at least one of the maintenance information or the secondary maintenance information comprises at least one of diagnostic information or performance information associated with one or more of the plurality of aircraft system components.

10. The aircraft system of claim 7, wherein the controller is configured to detect or isolate faults affecting one or more of the plurality of aircraft system components based upon at least one of the maintenance information or the secondary maintenance information.

11. The aircraft system of claim 10, wherein the controller is configured with a heuristic model for detecting or isolating the faults based upon at least one of the maintenance information or the secondary maintenance information.

12. The aircraft system of claim 10, wherein the controller is configured with a neural network for detecting or isolating the faults based upon at least one of the maintenance information or the secondary maintenance information.

13. The aircraft system of claim 10, wherein the plurality of aircraft system components include one or more sensors, actuators, switches, transmitters, receivers, transceivers, or I/O devices.

14. A method of implementing a secure onboard maintenance circuit (OMC) for a plurality of system components distributed among unclassified and classified security domains, the method comprising:
   connecting at least one system component of the plurality of system components and an operator interface device to a primary OMC node, the primary OMC node including:
      a configurable input/output (I/O) interface for connecting to the at least one system component of the plurality of system components and for connecting to the operator interface device;
      a trusted cross-domain solution (CDS) interface;
      a secure storage; and
      a controller in communication with the configurable I/O interface, the trusted CDS interface, and the secure storage;
   connecting at least one other system component of the plurality of system components to at least one secondary OMC node, the at least one secondary OMC node including:
      a second configurable I/O interface for connecting to the at least one other system component of the plurality of system components;
      a second trusted CDS interface; and
      a second controller in communication with the second configurable I/O interface and the second trusted CDS interface;
   receiving maintenance information from the at least one other system component via the second configurable I/O interface;
   transmitting the maintenance information to the primary OMC node via the second trusted CDS interface;
   receiving the maintenance information at the primary OMC node via the trusted CDS interface; and
   storing data associated with the maintenance information in the secure storage,
   wherein the plurality of system components includes one or more weapon replaceable assembly (WRA) components.

15. The method of claim 14, further comprising:
   receiving maintenance information from the at least one system component via the configurable I/O interface.

16. The method of claim 14, further comprising:
   presenting the data associated with the maintenance information via the operator interface device.

17. The method of claim 14, wherein the maintenance information comprises at least one of diagnostic information or performance information associated with one or more of the plurality of system components.

18. The method of claim 14, further comprising:
   detecting or isolating faults affecting one or more of the plurality of system components based upon the maintenance information.

19. The method of claim 18, wherein the maintenance information is fed into at least one of a heuristic model or a neural network for detecting or isolating faults affecting one or more of the plurality of system components.

20. A secure onboard maintenance circuit (OMC) for a plurality of system components distributed among unclassified and classified security domains, the secure OMC comprising:
   a primary OMC node, the primary OMC node including:
      a configurable input/output (I/O) interface for connecting to at least one system component of the plurality of system components;
      a trusted cross-domain solution (CDS) interface;
      a secure storage; and
      a controller in communication with the configurable I/O interface, the trusted CDS interface, and the secure storage, the controller configured to receive maintenance information via the configurable I/O interface and the trusted CDS interface and configured to store data associated with the maintenance information in the secure storage; and
   at least one secondary OMC node, the at least one secondary OMC node including:
      a second configurable I/O interface for connecting to at least one other system component of the plurality of system components;
      a second trusted CDS interface; and
      a second controller in communication with the second configurable I/O interface and the second trusted CDS interface, the second controller configured to receive secondary maintenance information via the second configurable I/O interface and configured to transmit the secondary maintenance information to the primary OMC node via the second trusted CDS interface,
   wherein the controller is configured with at least one of a heuristic model or a neural network for detecting or isolating faults affecting one or more of the plurality of system components based upon at least one of the maintenance information or the secondary maintenance information.

21. An aircraft system, comprising:
   an operator interface device;
   a plurality of aircraft system components distributed among unclassified and classified security domains;
   a primary OMC node, the primary OMC node including:
      a configurable input/output (I/O) interface for connecting to at least one system component of the plurality of aircraft system components and for connecting to the operator interface device;
      a trusted cross-domain solution (CDS) interface;
      a secure storage; and
      a controller in communication with the configurable I/O interface, the trusted CDS interface, and the secure storage, the controller configured to receive maintenance information via the configurable I/O interface and the trusted CDS interface and configured to store data associated with the maintenance information in the secure storage; and
   at least one secondary OMC node, the at least one secondary OMC node including:
      a second configurable I/O interface for connecting to at least one other system component of the plurality of aircraft system components;
      a second trusted CDS interface; and
      a second controller in communication with the second configurable I/O interface and the second trusted CDS interface, the second controller configured to receive secondary maintenance information via the second configurable I/O interface and configured to transmit the secondary maintenance information to the primary OMC node via the second trusted CDS interface, wherein the controller is configured with at least one of a heuristic model or a neural network for detecting or isolating faults affecting one or more of the plurality of system components based upon at least one of the maintenance information or the secondary maintenance information.

22. A method of implementing a secure onboard maintenance circuit (OMC) for a plurality of system components distributed among unclassified and classified security domains, the method comprising:

connecting at least one system component of the plurality of system components and an operator interface device to a primary OMC node, the primary OMC node including:
- a configurable input/output (I/O) interface for connecting to the at least one system component of the plurality of system components and for connecting to the operator interface device;
- a trusted cross-domain solution (CDS) interface;
- a secure storage; and
- a controller in communication with the configurable I/O interface, the trusted CDS interface, and the secure storage;

connecting at least one other system component of the plurality of system components to at least one secondary OMC node, the at least one secondary OMC node including:
- a second configurable I/O interface for connecting to the at least one other system component of the plurality of system components;
- a second trusted CDS interface; and
- a second controller in communication with the second configurable I/O interface and the second trusted CDS interface;

receiving maintenance information from the at least one other system component via the second configurable I/O interface;

transmitting the maintenance information to the primary OMC node via the second trusted CDS interface;

receiving the maintenance information at the primary OMC node via the trusted CDS interface;

detecting or isolating faults affecting one or more of the plurality of system components based upon the maintenance information, wherein the maintenance information is fed into at least one of a heuristic model or a neural network for detecting or isolating faults affecting one or more of the plurality of system components; and storing data associated with the maintenance information in the secure storage.

* * * * *